(12) United States Patent
Hennessey (10) Patent No.: US 6,845,385 B1
(45) Date of Patent: *Jan. 18, 2005

(54) REAL-TIME COMPUTER "GARBAGE COLLECTOR"

(75) Inventor: Wade Hennessey, Palo Alto, CA (US)

(73) Assignee: Object Technology Licensing Corp., CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/014,470

(22) Filed: Dec. 14, 2001

Related U.S. Application Data (62) Division of application No. 08/274,923, filed on Jul. 13, 1994, now Pat. No. 6,341,293.

(51) Int. Cl.[7] .............................................. G08F 17/30
(52) U.S. Cl. ...................... 707/206; 717/141
(58) Field of Search ................................ 707/206, 204; 717/141; 380/33

(56) References Cited

U.S. PATENT DOCUMENTS 5,088,036 A * 2/1992 Ellis et al. .................. 707/206
6,052,699 A * 4/2000 Huelsbergen et al. ....... 707/204
6,308,319 B1 * 10/2001 Bush et al. .................... 380/33
6,341,293 B1 * 1/2002 Hennessey .................. 707/206

* cited by examiner

Primary Examiner—Charles Rones
(74) Attorney, Agent, or Firm—Joseph C. Redmond, Jr.; Morgan & Finnegan, LLP (57) ABSTRACT

The present invention provides a novel method and apparatus for performing real-time computer garbage collection, in a manner that offers unprecedented low bounds on the worst-case frequency and duration of the collection task. The invention is used with a plurality of data objects and with one or more mutator programs. The mutators and a garbage collector run on one or more processors. The mutators each have a corresponding thread with a corresponding thread state. In the present invention, execution of all mutators is temporarily restricted at the start of each new garbage collection cycle. However, unrestricted execution of a mutator is quickly resumed, as soon as that mutator's thread state is processed. The remainder of the garbage collection cycle may be performed concurrently with the mutators. In another feature of the present invention yielding important performance benefits, the mutators are executed subject to a protective write barrier, but the write barrier does not have to be applied to the modification of mutator thread states.

20 Claims, 5 Drawing Sheets

REAL-TIME COMPUTER "GARBAGE COLLECTOR"

CROSS-REFERENCE TO RELATED APPLICATION

This application is a divisional anplication of Ser. No. 08/274,923, filed Jul. 13, 1994, now U.S. Pat. No. 6,341, 293B1, issued Jan. 22, 2002, and assigned to the same assignee as that of the present invention and fuilly incorporated herein.

REFERENCE TO A COMPUTER PROGRAM LISTING

Two copies of a single compact disk, labeled "Computer Program Listing—Ser. No. 10/014,470 (Hennessey); Filed Dec. 14, 2001; "Real-Time" Garbage Collector; Appendix Copy 1 and Appendix Copy 2 are attached and incorporated herein.

FIELD OF THE INVENTION

This invention relates to the field of computer memory management, and in particular to the problem of efficiently performing computer garbage collection in real-time.

BACKGROUND

Computer programs typically make use of variables or similar labels to reference data "objects." A portion of computer memory must be allocated during execution to each such object. Over time, as many such objects are created and used, the available, "free" memory that remains to be allocated in a particular system may begin to run short. As is well known in the art, a variety of methods and techniques have been proposed and implemented to reclaim as "free" and available those portions of computer memory that were originally allocated to program objects that are no longer in use by any running program. This task is generally known in the artas "garbage collection." A great variety of different garbage collection techniques have been developed and used; for example, the reference paper *Uniprocessor Garbage Collection Techniques* by Paul R. Wilson (available through Internet via anonymous FTP from cs.u-texas.edu as pub/garbage/bigsurv.ps) provides a broad survey of existing techniques, and explains commonly used terminology. That paper is incorporated herein in its entirety by this reference.

Prior art garbage collection systems have generally suffered to various degrees from the problem of excessive pause times. This problem arises when garbage collection is performed in real-time, i.e., concurrently with the execution of other live programs running on one or more processors. (In the field of garbage collection, the other live programs are typically referred to as "mutators," because such programs potentially "mutate" or change the state of memory, from the point of view of the garbage collector or "GC.")

For example, suppose that a system contains multiple mutator threads and a single GC thread. (A "thread" is an execution context within a shared address space, as discussed further below.) If the mutators are, for example, trying to present a movie at 30 frames per second, and they require a combined time of 23 ms to generate each frame, then problems will arise if the GC thread is run for more than loms during any particular 33 ms interval. It would therefore be desirable in this scenario to guarantee that the garbage collector will run no more than 30 times per second (i.e., its frequency will be no greater than 30; equivalently, its period will be greater than or equal to 33 ms), and also that each time the garbage collector is run it will execute for a maximum duration of no more than 10 ms.

GC frequency and duration can of course be kept "limited" through brute force, in the sense that the execution time allotted to the GC program may be explicitly rationed under control of the operating system or some other scheduling manager. This does not solve the problem at hand, however, because garbage collectors generally perform certain non-deferable, atomic work that must not be interrupted by mutators, at the risk of causing potential memory corruption. For example, a well-known family of GC schemes known as "copying" collectors (described in the Wilson survey paper, for example) actually copy, to a new location in memory, each data object that is determined not to be garbage (i.e., the object may still be in use by a live program). Since each such data object can potentially be arbitrarily large, and because the copying operation is necessarily atomic, a copying garbage collector may enter a phase where it cannot be interrupted by any mutator for an arbitrarily long period of time. Such GC schemes are generally not satisfactory for real-time systems where a maximum GC duration is required.

While non-copying garbage collectors also exist in the prior art (e.g., Henry G. Baker Jr., The Treadmill: Real-Time Garbage Collection Without Motion Sickness, SIGPLAN Notices Vol. 27 No. 3 at pp. 66–70, March 1992, incorporated herein in its entirety by this reference), many current applications of interest—notably, in the realm of multimedia—require limits on the maximum frequency and duration of garbage collection that the prior art has so far failed to dependably satisfy, at least on general-purpose stock hardware. As a result, systems running multimedia applications and the like have so far been unable to use garbage collection, and have instead been forced to rely on inconvenient, manual storage management techniques.

SUMMARY OF THE INVENTION

The present invention disclosed herein provides a novel method and apparatus for real-time garbage collection that offers unprecedented low bounds on the worst-case for GC frequency and duration.

Briefly, the present invention is used with a plurality of objects and with one or more mutators. The mutators, and the garbage collector itself, run on one or more computer processors, as scheduled by a scheduler. Stock hardware may be used; i.e., special purpose hardware is not necessary. The mutators each have a corresponding thread with a corresponding thread state. In the present invention, execution of all mutators is temporarily restricted at the start of each new garbage collection cycle. However, unrestricted and concurrent execution of each mutator is resumed, as soon as that mutator's thread state is processed by the garbage collector.

In another feature of the present invention, the mutators are executed subject to a protective write barrier. However, the write barrier does not have to be applied to the modification of any mutator thread states, yielding valuable performance benefits.

DETAILED DESCRIPTION OF THE PREFERRED EMBODIMENTS

Basic Concepts and Definitions

Figure 1:
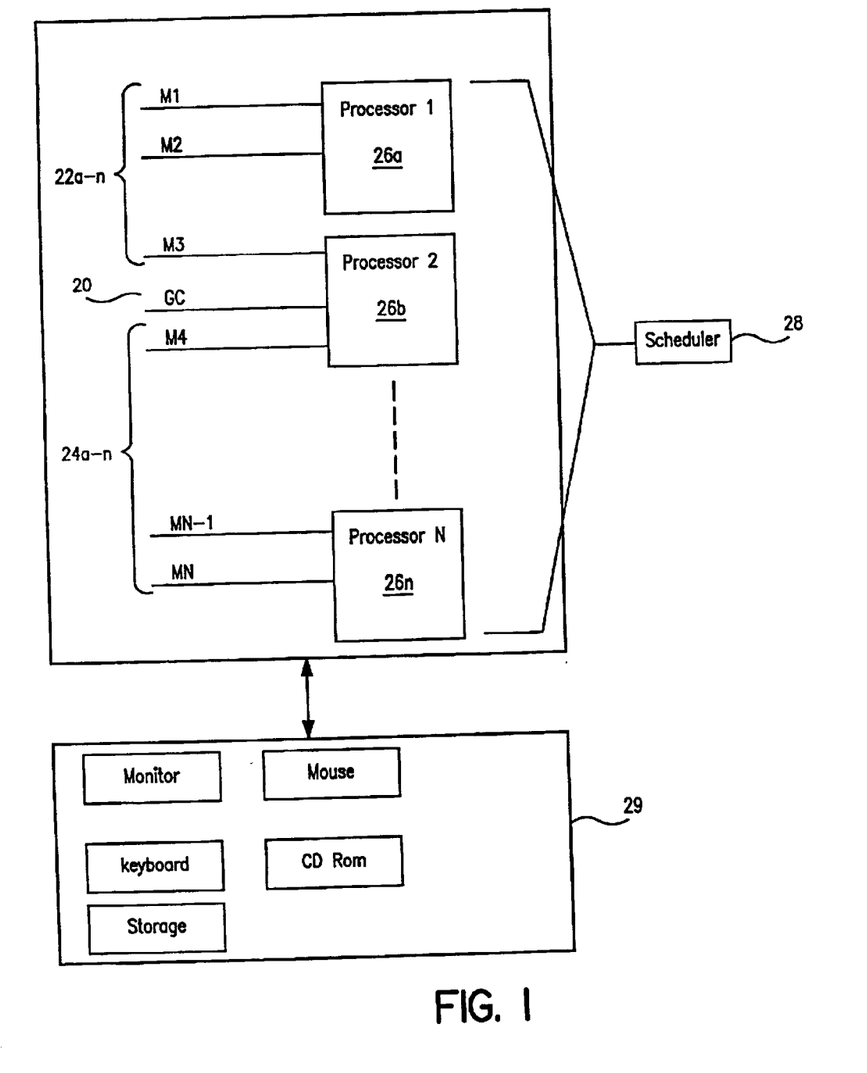
FIG. 1 illustrates representative apparatus for practicing the present invention.

FIG. 1 depicts a representative system that may be employed to embody the present invention. Garbage collection preferably takes place in its own execution thread 20 in real-time and concurrently with the execution of multiple mutator "threads" 22a–n and 24a–n. All of these various threads are run on one or more processors 26a–n. Where, as in the typical case, there are more live threads than processors, Scheduler 28 manages processors 26a–n by allocating each processor's time and resources among the multiple live threads. Processors 26a–n preferably interact with standard input/output facilities 29.

Formally, a thread is an execution context within a shared address space. A thread's "state" is defined by an associated set of local data, such as a run-time stack and a set of registers, or the like. Multiple threads preferably access other data—e.g., global data and heap data—within a shared, common address space. For purposes of illustration, we will often discuss each thread in terms of its associated stack and register set, although it will be readily appreciated by those of skill in the relevant art that alternate implementations of threads and thread states, or the equivalent, are possible, and would generally be within the scope of the present invention.

Figure 2:
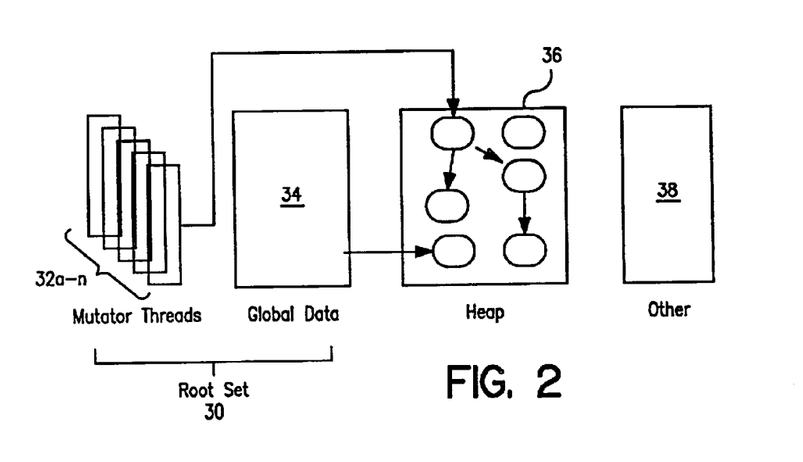
FIG. 2 depicts an illustrative classification of program memory for purposes of the present invention.

FIG. 2 classifies program memory for purposes of garbage collection. The "root set" 30 contains all data which is directly accessible by the program: this includes each thread state 32a–n, as well as all global pointers 34 in the program's data sections. Heap 36 contains pointers which are indirectly accessible by the program via the root set. Any and all other portions of memory 38 (e.g., static code segments storing machine instructions) are ignored by the garbage collector.

An object's state with respect to the garbage collector is conceptually described by one of four "colors":

1. White—These objects are currently subject to collection. It is as yet uncertain whether these objects are live (i.e., accessible to a running mutator program) or garbage (i.e., inaccessible).
2. Black—These objects have been classified as live during the current GC cycle, and any pointers within these objects have also been traced. The notion of a GC cycle is further described below.
3. Gray—These objects have been classified as live during the current GC cycle, but at least some of the pointers within these objects have not been traced yet.
4. Green—These objects are garbage, free to be allocated.

Figure 3:
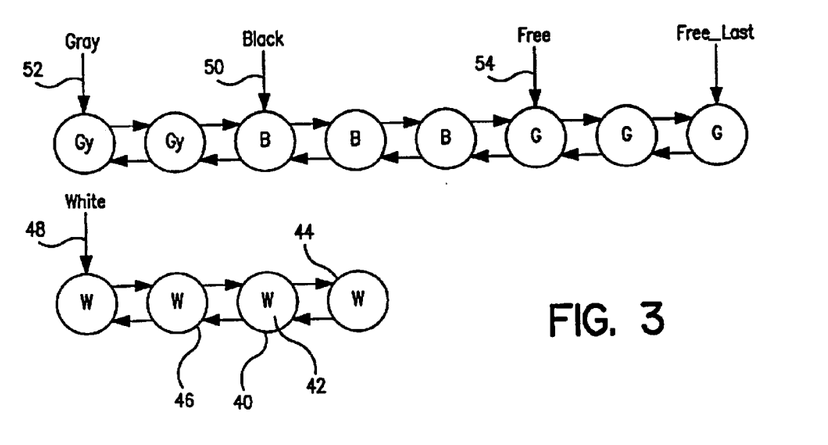
FIG. 3 illustrates the external pointers and the doubly-linked used to keep track of object "color" in a preferred embodiment of the invention.

As shown in FIG. 3, the color information for an object is redundantly represented in two ways. First, the color information is stored directly within each object (such as for sample object 40) in an explicit field (such as sample color field 42). In addition, each object contains link pointers (such as sample pointers 44 and 46) that place it within a doubly linked list corresponding to its color. Thus, four external pointers—White 48, Black 50, Gray 52, and Free (or Green) 54-point to the first object in each such list. Baker's Treadmill (cited earlier above) similarly linked every object subject to garbage collection into a doubly-linked list reflecting its status.

With respect to the color information stored directly in an object, Gray and Green may be represented by constant bit patterns. However, because of the "flip" operation performed at the start of each GC cycle, as described below, the meanings of the two respective bit patterns corresponding to Black and White alternate, and are determined by the values of two global variables (e.g., current_black and current_white). If the color bit pattern matches current black, then the object is black; likewise, a match with currentwhite indicates that the object iswhite.

The Garbaae Collection Cycle

Garbage collection is performed in cycles. The basic steps of each such cycle are charted in FIG. 4. According to the present invention, when a new cycle is commenced, all mutators are temporarily restricted from modifying memory by creating any new data objects. This is reflected in steps 60 and 62. A mutual exclusion ("mutex") lock or similar protection mechanism may be readily employed to effect this purpose. The net effect is that as each new GC cycle begins, scheduler 28 will temporarily suspend the execution of any mutator that attempts to create a new object. Of course, the start of a new cycle can be delayed until a convenient moment if required bythe mutators.

Figure 4:
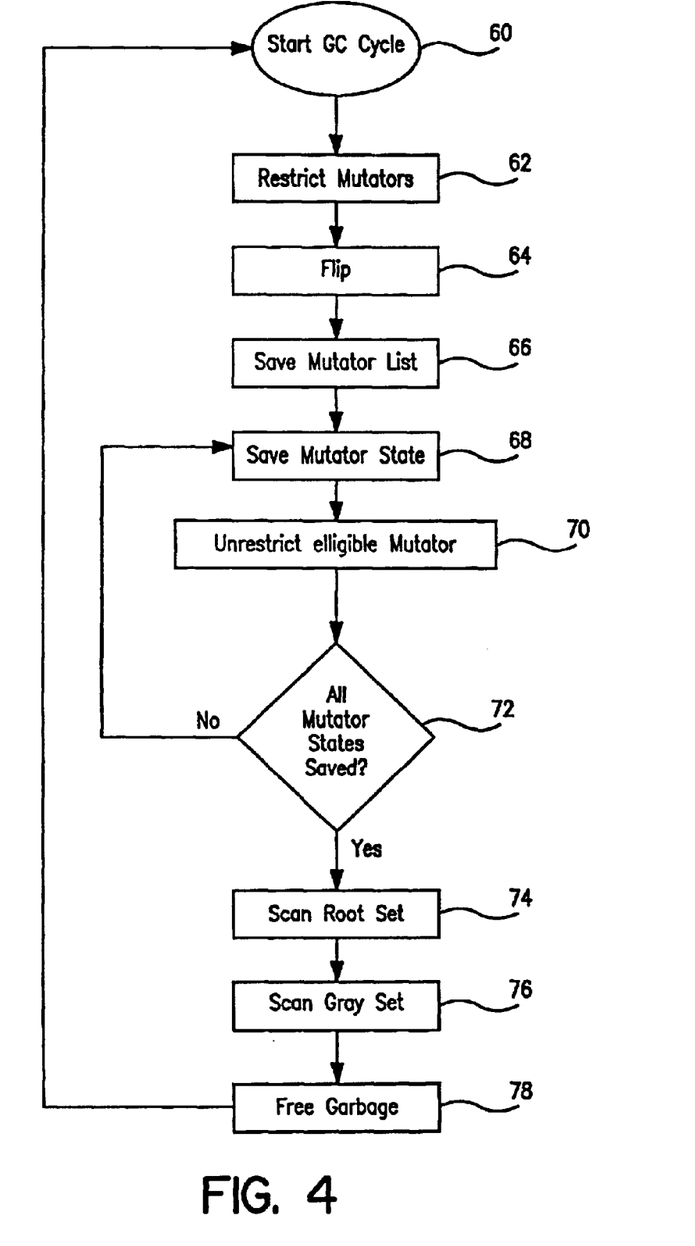
FIG. 4 shows a flow chart of garbage collection steps that are performed in the preferred embodiment of the present invention.

An important aspect of the present invention is that the temporary restriction on mutators is extremely brief, as explained below. At step 64, a "flip" is performed. At the start of each GC cycle, every data object that is a candidate for potential collection starts out initially as Black. That is because all data objects when first created are initially allocated as Black, and because any data object that existed during the previous cycle and that was not labelled as Free garbage must have been labelled Black. Therefore, the basic purpose of flip 64 is to relabel all of the Black objects as White (i.e., as current candidates for collection). This is done simply by making the White list pointer point to the head of the previous Black list, and by re-initializing the Black list pointer. The meaning of the color information stored directly in data objects is likewise flipped, very simply by swapping the values of current black and currentwhite.

At this point, scheduler 28 preferably suspends the execution of all mutators completely. (In fact, for simplicity, execution of mutators may be temporarily suspended in entirety beginning at step 62.) At step 66, a list of all live threads is saved. Next, at step 68, the state information (e.g., the live portion of stack and register information) for each mutator thread is processed. This "processing" step may be done directly by performing scanning step 74 described below, or may be more quickly performed by simply saving each thread state—such as by copying that information to a "mirror" area—one thread at a time, for subsequent use in step 74. The mirror area may preferably be allocated in memory at thread creation time for usage by the garbage collector. In fact, "saving" a thread state may be performed without necessarily copying the thread information right away, but instead simply setting (under control of the operating system) the protection status of thread state as "copy-on-write." As is well known in the art, setting memory protection status in this way will cause actual copying to take place only when and as needed.

Importantly, as represented by step 70, each mutator is permitted to resume executing in unrestricted fashion as soon as its own thread information has been processed. Thus, any "pause" experienced will be minimal; a mutator can rest assured that its unrestricted execution will be resumed within an infinitesimally short amount of time that varies only with the size of the thread state for that mutator. In practice, all of these initial steps (i.e., steps 60 through 66 and step 68 with respect to a given mutator) will collectively require no more than a handful of milliseconds, at worst.

Thus, once thread state information has been processed, a mutator is essentially free to execute whenever it desires (from the perspective of the garbage collector), until the end of the GC cycle. The remainder of the GC cycle—which actually, in terms of duration, is by far the lion's share of each cycle—is devoted to tracing through memory and identifying those data objects that are still in use and cannot be recycled.

As shown in steps 74 and 76, this remaining portion of the GC cycle really proceeds in two primary phases. The first phase, step 74, involves scanning the root set's pointers: i.e., pointers stored in either the saved U; thread states or in global data. These pointers identify memory locations that are directly accessible by an executing program. Pointers stored in root set locations may reference objects in the heap; scanning or tracing the root set thus simply identifies all of the heap objects that may be directly referenced by a running program through root set pointers. For each root set pointer, the collector determines if the pointer points to an object in the heap. If so, the object's color is inspected; if the object was until now White, then the object is made Gray. An object is made Gray by removing it from the White list via the double link pointers, and prepending it to the head of the Gray list. Since all Gray objects ultimately turn Black by the end of a GC cycle, the Gray list is contiguous with the Black list, and the Gray list pointer points at the current head of the Gray list. Thus, after step 74 is completed and all of the root pointers have been examined, the Gray list will contain all data objects that are directly accessible via root set pointers.

Figure 5A:
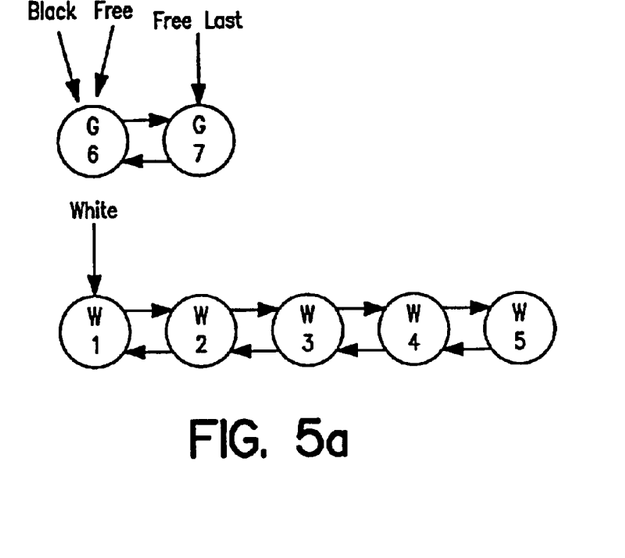
FIG. 5a depicts a simple example of some objects and their "color" status prior to scanning.
Figure 5B:
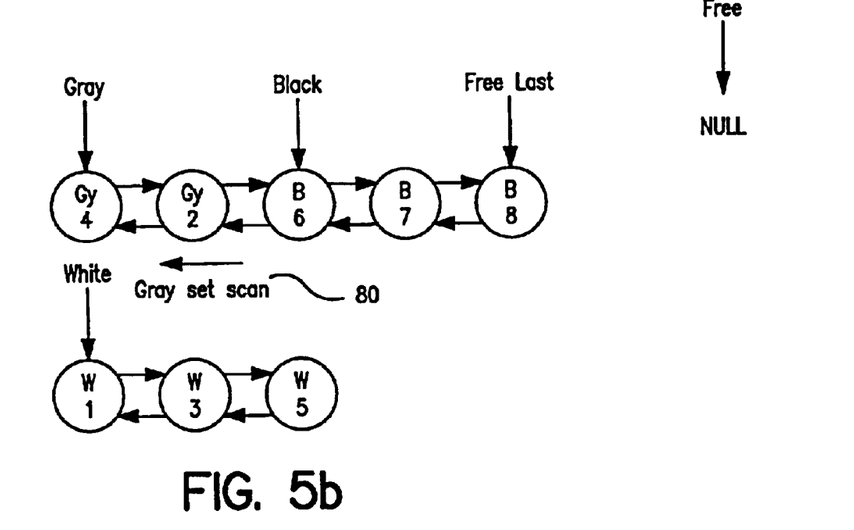
FIG. 5b depicts the same simple example, but after some scanning has been done in accordance with the present invention.

FIGS. 5a and 5b provide a simple example to illustrate the activity of scanning the root set during step 74. FIG. 5a shows objects 1–5 as White, before scanning has been done. FIG. 5b reflects the results of some scanning: objects 1, 3, and 5 are still White, but the scan step has determined that objects 2 and 4 are pointed to by the root set, and those two objects have therefore been made Gray. In addition, FIG. 5b shows that new objects, 6, 7, and 8, have been created (presumably by concurrently executing mutators), and have all been properly initialized as Black objects 6 and 7 were "recycled" from Free objects 6 and 7 (FIG. 5a). In this example, no objects remain on the Free list for further recycling, although additional memory not yet managed by the garbage collector may exist (such as was used for allocating object 8).

Referring once again to FIG. 4, the next step 76 identifies all of the indirectly accessible objects: i.e., those data objects that are not pointed to directly by the root set, but can instead be transitively referenced, in that other accessible objects within the heap point at them. This step 76 involves iteratively scanning or tracing every Gray object—i.e., every object that is live, and that contains pointers to currently White objects—so as to follow all accessible pointers to any other objects within the heap; such objects when found are in turn also marked as Gray. This technique is continued recursively, until the entire tree of reachable objects is traced out and identified.

In more detail, scanning at step 76 proceeds from left to right, as indicated in FIG. 5b at 80. The Gray object immediately to the left of the first Black object—in this case, Gray object 2, to the left of Black object 6—is the next Gray object to scan. Just as with the root set, all pointers in each Gray object must be examined. When every pointer within a given object has been traced, that object's color is changed to Black: i.e., it's internal color is directly changed, and the Black list pointer is advanced one object to the left using the double links. If a pointer in a Gray object being scanned is found to reference a White object in the heap, that heap object is in turn removed from the White list and prepended to the left-most end of the Gray list. Scanning the Gray list in this manner effectively provides a breadth-first traversal through the tree of all accessible objects in the heap.

Figure 6:
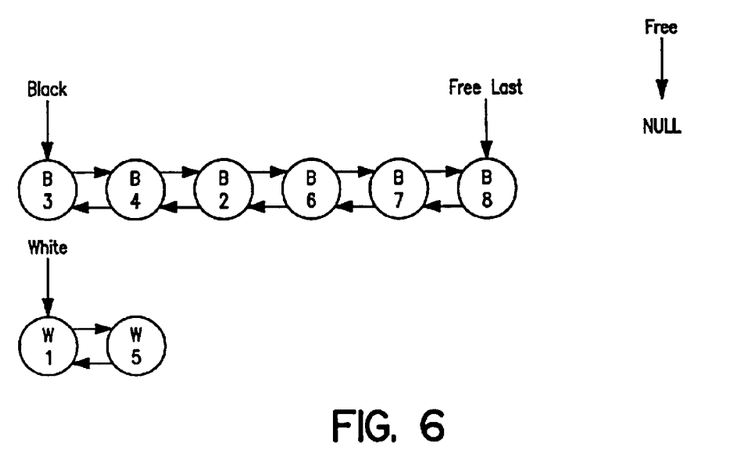
FIG. 6 depicts the same simple example, but after further scanning has been done in accordance with the present invention.

When the Gray list pointer and the Black list pointer are equal, there are no more Gray objects, as shown in FIG. 6. At this point, traversal is complete: all accessible, live objects have been marked Black, while everything else (in this case, objects 1 and 5) remains White, and may safely be regarded as garbage to be made available for recycling. In order to recycle these garbage objects, each object in the White list should have its color set to Green, assuming that a "conservative" collection scheme is being employed, as is well known in the art. Non-conservative collectors may omit the Green coloring. In either case, the data object at the head of the White list is then appended to the end of the Free list at step 78, and is thereby made available for reuse. This completes the GC cycle.

Note that this technique has been described in terms of multiple threads running on one or more processors, but all associated with a single address space. If multiple address spaces are used in the target environment, then the present method may simply be repeatedly applied in the same way to each address space, as will be evident to those of skill in the art.

Concurrently Executing the Mutators and Collector, Using a Write Barrier

We have explained that after the initial work involved in steps 60 through 66 and part of step 68 is done, mutator execution may proceed concurrently with the remaining work of the garbage collection cycle. However, an additional precaution is necessary to prevent mutators from transferring pointer information in ways that inadvertently fool the garbage collector into wrongly characterizing an object as garbage. Briefly, the potential problem may be illustrated as follows. Suppose that the pointer to a particular White object in the heap is, at the start of a new GC cycle, only stored in a single, live object. Suppose further that sometime during the cycle, a mutator overwrites that pointer, but copies it first into another data object. Suppose further that this other data object—which is now the sole live route for accessing the White object on the heap—has already been fully traced and marked Black by the garbage collector at this point. In this scenario, a problem arises because the White heap object is still accessible and is not truly garbage, but the garbage collector will never find any path to it during this cycle, and will therefore ultimately mischaracterize it as garbage. This problem is well known in the art, as is the solution of employing a so-called "write barrier." For the present invention, a write barrier of the "snapshot-at-beginning" variety known in the art is preferably used, although, as explained further below, the manner of applying the write barrier in accordance with the present invention is novel in certain very important respects.

Figure 7:
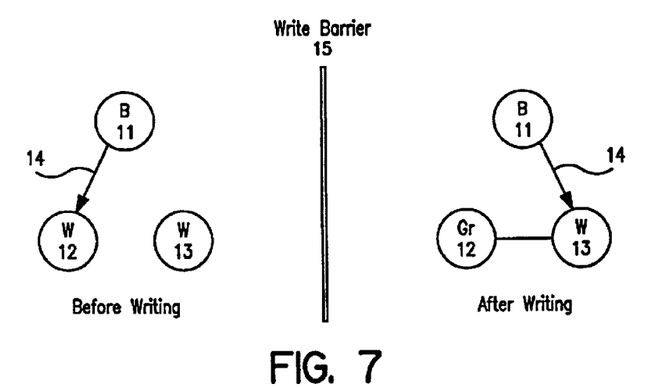
FIG. 7 illustrates the use of a write barrier.

Basically, such a write barrier is intended to ensure that all objects which are live as of the instant a new GC cycle begins will be successfully traced and retained by the garbage collector. The write-barrier is preferably applied only to code running on a mutator thread. Any pointer writes into the heap or the global data section must go through the write barrier. The write barrier works by examining the pointer that is about to be overwritten. If the pointer which is about to be overwritten points at a White object in the heap, then that object must be made Gray. For example, as shown in FIG. 7, the color of object 12 is changed from White to gray by write barrier 15, before pointer 14 is overwritten. The change to Gray may be done immediately, or it may be done lazily by saving a copy of the pointer in a list and allowing the GC to examine the pointer at some point before the current collection is complete. If immediate Graying is chosen, and the invention is being practiced in a multi-processor environment, then it is further necessary to prevent different threads from simultaneously modifying the Gray list, in order to avoid possible corruption of the list. This protection may easily be achieved by means of a mutex lock, as will be evident to one of ordinary skill in the art. Write barrier 15 may be implemented by modifying a compiler applied to the mutators, so as to invoke a suitable routine wherever pointer overwrites are attempted. Alternately, calls to a routine may be manually inserted; a simple parser may be implemented by one of ordinary skill to flag potential pointer overwrites. In any case, write barrier 15 ensures that all objects which are live at the start of a collection cycle will be made Black by the collector sometime during that cycle.

Note that the write barrier preferably need not be used with respect to modification of the initial pointer values in a newly created object, since all new objects are preferably initialized with a special value such as NULL when first allocated, and NULL cannot possibly point at a White object in the heap.

An important aspect of the present invention is that modifications of pointers stored as part of the thread state—i.e., in the thread stack or registers—are preferably not made subject to write barrier 15. This exception can safely be made, because the present invention always saves thread state information during the initial phase of each GC cycle, before any mutators can possibly alter the thread state; thus, all objects references from within the thread state areas will have been preserved. Therefore, once the mutator threads have been scanned during the beginning of a new collection cycle, they need not be examined again during that cycle, nor need they be made subject to write barrier 15.

The result of applying write barrier 15 in this manner is dramatic. In practice, most mutator modification is done with respect to the thread state, as opposed to other data. Even more importantly, thread state modification typically involves fast, register-type access and avoids the overhead of main memory access. Application of the write barrier, of course, necessarily introduces main memory access each time, since the pointer being modified must be traced into the heap. Consequently, applying the write barrier to modification of thread state pointers, as has been conventional in the prior art, necessarily introduces severe performance penalties. These penalties are themselves a further reason why prior art garbage collection systems have been unable to satisfactorily service real-time multimedia applications and systems. The present invention, as explained, is free of such prohibitive penalties.

Source code created by the author for use in implementing the present invention in the C programming language is included in the compact disk referenced above in the Section heading "REFERENCE TO A COMPUTER PROGRAM LISTING" for purposes of further illustration of a preferred embodiment.

Performance Analysis

The maximum GC duration is determined by the single longest step in the collection process. Step 62 (flip) is atomic but is of extremely short, constant duration. Essentially only two segments of the present collection method are both atomic and of variable duration: making the list of all live threads (step 66), and processing the live portion of a thread's state (step 68, with respect to a given thread). Thus, the worst case GC duration for the present method is proportional to the maximum number of live threads, and to the maximum thread state size allowed by the system in use.

Recall that the present garbage collector only restricts mutator execution at the beginning of each GC cycle until that mutator's corresponding thread state has been processed. Except for this part of the algorithm, the frequency of the GC increments is completely controllable by the mutator threads or scheduler 28 which decides when it is best for the collector to run. Hence, the worst case for GC frequency is again proportional to the number of live threads.

In practice, it has been found empirically that for typical, state-of-the-art multimedia systems, the maximum number of live threads and the maximum thread state size lead to worst-case bounds on GC frequency and duration that are acceptably within the requirements of typical multimedia application programs. Thus, the present invention has been found to solve a pressing problem in that, to the best of the author's knowledge, has not been satisfactorily addressed by any prior art systems in the field of garbage collection.

Another significant advantage of the present invention is its suitability for implementation on stock hardware. In other words, each of processors 26a–n may be a standard computer CPU (such as one in the Motorola® 68000 series, a SPARC® CPU, or Power PC®), or a virtual software processor running on standard hardware; special purpose hardware is not required. Those of skill in the art may of course recognize various opportunities to increase performance further through the use of some special purpose hardware. Such enhancement, while by no means necessary, remains squarely within the scope of the present invention.

It will be understood and appreciated by those of skill in the art that numerous variations on the preferred embodiments described herein are possible, while remaining within the spirit and scope of the present invention. The invention is limited only by the following claims.

What is claimed is:

1. A method for invoking a write barrier during real-time computer garbage collection, for use with a plurality of data objects and with one or more mutator programs, each one of said mutators having a corresponding thread and each one of said mutator threads having a corresponding thread state separate from said plurality of data objects, said method comprising the steps of:

temporarily restricting execution of said mutators during a garbage collection cycle, while processing the corresponding thread state for each one of said mutators;

permitting each one of said mutators to resume unrestricted execution, as soon as said mutator's own corresponding thread state has been processed;

identifying each one of said objects that is currently accessible to at least one of said mutators; and executing said mutators subject to a write barrier which is invoked when said mutators modify pointers within said plurality of data objects but not when said mutators modify pointers within said thread states.

2. The method of claim 1, wherein said step of temporarily restricting the execution of said mutators includes a first step of restricting said mutators from creating any new data objects, and a second step of temporarily suspending execution of said mutators.

3. The method of claim 1, which further comprises:
   tracing one or more pointers stored in said objects, for each one of said objects that is in turn pointed to by at least one pointer stored in at least one of said mutator thread states.

4. A computer program product to perform real-time computer garbage collection, for use with a plurality of data objects and with one or more mutator programs, each one of said mutators having a corresponding thread and each one of said mutator threads having a corresponding thread state separate from said plurality of data objects, comprising:
   a computer readable medium;
   program code in said computer readable medium to commence a new garbage collection cycle;
   program code in said computer readable medium to temporarily restrict execution of said mutators while processing the corresponding thread state for each one of said mutators;
   program code in said computer readable medium to permit each one of said mutators to resume unrestricted execution, as soon as said mutator's own corresponding thread state has been processed; and
   program code in said computer readable medium to complete the garbage collection cycle by identifying each one of said objects that is currently accessible to at least one of said mutators.

5. The computer program product of claim 4, wherein said program code in said computer readable medium for commencing a garbage collection cycle further includes program code for flipping one or more of said objects, from a first label representative of accessible status to a second label representative of undetermined status.

6. The computer program product of claim 4, wherein said program code in said computer readable medium for commencing a garbage collection cycle further includes program code for saving a list of said mutator threads.

7. The computer program product of claim 4, wherein said program code in said computer readable medium for temporarily restricting the execution of said mutators includes a first program code for restricting said mutators from creating any new data objects, and a second program code for temporarily suspending execution of said mutators.

8. The computer program product of claim 4, wherein said program code in said computer readable medium for completing the garbage collection cycle further includes program code for tracing one or more pointers stored in each of said mutator thread states.

9. The computer program product of claim 4, wherein said program code in said computer readable medium for completing the garbage collection cycle further includes program code for tracing one or more pointers stored in said objects, for each one of said objects that is in turn pointed to by at least one pointer stored in at least one of said mutator thread states.

10. The computer program product of claim 4, wherein said program code in said computer readable medium for completing the garbage collection cycle is performed without copying any object in said plurality of data objects.

11. The computer program product of claim 4, wherein said program code in said computer readable medium for completing the garbage collection cycle further includes program code for executing said mutators subject to a write barrier which is invoked when said mutators modify pointers within said plurality of data objects but not when said mutators modify pointers within said thread states.

12. An apparatus for performing real-time computer garbage collection, for use with a plurality of data objects and with one or more mutator programs, each one of said mutators having a corresponding thread and each one of said mutator threads having a corresponding thread state separate from said plurality of data objects, said apparatus comprising:
   a garbage collector for processing the corresponding thread states of said mutators at the beginning of a garbage collection cycle, and for identifying each one of said data objects that is accessible to at least one of said mutators during said cycle;
   one or more processors for executing said garbage collector and said mutators; and
   a scheduler coupled to said processors for scheduling execution of said garbage collector and said mutators on said processors, said scheduler being operative to temporarily restrict execution of said mutators while the corresponding thread state is being processed for each one of said mutators, and to permit each one of said mutators to resume unrestricted execution as soon as said mutators own corresponding thread state has been processed.

13. The apparatus of claim 12, wherein said garbage collector further includes a processor for flipping said one or more objects from a first label representative of accessible status to a second label representative of undetermined status.

14. The apparatus of claim 12, wherein said garbage collector further includes a storage for saving a list of said mutator threads.

15. The apparatus of claim 12, wherein said garbage collector includes a processor for tracing one or more pointers stored in each of said mutator thread states.

16. The apparatus of claim 12, wherein said garbage collector includes a processor for tracing one or more pointers stored in said data objects, for each one of said objects that is in turn pointed to by at least one pointer stored in at least one of said mutator thread states.

17. The apparatus of claim 12, wherein said garbage collector does not copy said data objects.

18. The apparatus of claim 12, wherein said one or more processors are implemented with stock hardware.

19. The apparatus of claim 12, wherein said scheduler is operative to temporarily restrict said mutators from creating any new data objects, and is further operative to suspend execution of said mutators.

20. The apparatus of claim 12, further including a processor for executing said mutators subject to a write barrier which is invoked when said mutators modify pointers within said plurality of data objects but not when said mutators modify pointers within said thread states.

* * * * *